(12) United States Patent
Evans

(10) Patent No.: US 8,918,287 B2
(45) Date of Patent: Dec. 23, 2014

(54) METHOD OF DETERMINING DENSITY OF UNDERGROUND FORMATIONS USING NEUTRON-GAMMA RAY MEASUREMENTS

(75) Inventor: Michael Evans, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 719 days.

(21) Appl. No.: 13/262,643

(22) PCT Filed: Apr. 14, 2010

(86) PCT No.: PCT/EP2010/002334
§ 371 (c)(1),
(2), (4) Date: Mar. 16, 2012

(87) PCT Pub. No.: WO2010/118875
PCT Pub. Date: Oct. 21, 2010

(65) Prior Publication Data
US 2012/0166087 A1      Jun. 28, 2012

(30) Foreign Application Priority Data

Apr. 17, 2009 (EP) .................................... 09158182

(51) Int. Cl.
*G01V 5/10* (2006.01)

(52) U.S. Cl.
CPC ..................................... *G01V 5/101* (2013.01)
USPC ............................................................ 702/8

(58) Field of Classification Search
CPC ..................................................... G01V 5/101
USPC ............................................................. 702/8
See application file for complete search history.

(56) References Cited

U.S. PATENT DOCUMENTS 5,608,215 A      3/1997  Evans
7,573,027 B2 *   8/2009  Huiszoon ................... 250/269.1
(Continued)

FOREIGN PATENT DOCUMENTS

GB     1424023     2/1976
SU      351145     9/1972
(Continued)

OTHER PUBLICATIONS

Tittman, J., and Wahl, J.S., The Physical Foundations of Formation Density Logging (Gamma-Gamma), Geophysics, vol. 30, 1965.

(Continued)

*Primary Examiner* — Bryan Bui
(74) *Attorney, Agent, or Firm* — Stephanie Chi

(57) ABSTRACT

A method of determining the density of an underground formation surrounding a borehole from measurement of gamma rays arising from irradiation of the formation by a nuclear source in a tool body located in the borehole, and measurement of gamma-ray flux in the tool body at two different detector spacings from the source, the method comprising determining a substantially straight-line relationship between gamma-ray flux measurements at each different spacing with respect to the density of the formation for a tool body with no standoff; determining a relationship defining the deviation with respect to tool standoff of the density determined from the measured gamma-ray flux measurements at the two different detector spacings from the density calculated from the straight line relationships; and for a given pair of gamma-ray flux measurements at the different detector spacings, determining the intersection of the relationship defining the deviation with the straight line relationship so as to indicate the density of the formation surrounding the bore-hole; wherein the source is a neutron source and the gamma rays measured in the too! body are neutron-induced gamma rays resulting from neutron irradiation of the formation.

20 Claims, 5 Drawing Sheets

(56) References Cited

U.S. PATENT DOCUMENTS

| | | |
|---|---|---|
| 2002/0008197 A1 | 1/2002 | Michael |
| 2003/0178560 A1 | 9/2003 | Odom et al. |
| 2004/0021066 A1 | 2/2004 | Schneider |
| 2004/0222368 A1 | 11/2004 | Odom et al. |
| 2008/0061225 A1* | 3/2008 | Orban et al. ............... 250/269.3 |
| 2009/0026359 A1 | 1/2009 | Stephenson et al. |

FOREIGN PATENT DOCUMENTS

| | | |
|---|---|---|
| WO | 96/08733 | 3/1996 |
| WO | 2006/116299 | 11/2006 |
| WO | 2007/149869 | 12/2007 |

OTHER PUBLICATIONS

Decision on grant for the equivalent Russian patent application No. 2011146647 issued on Jan. 29, 2014.

J.S. Wahl, et al., "The dual spacing formation density log", Journal of Petroleum Technology, AIME, Dallas, TX, US pp. 1411-1416.

* cited by examiner

METHOD OF DETERMINING DENSITY OF UNDERGROUND FORMATIONS USING NEUTRON-GAMMA RAY MEASUREMENTS

TECHNICAL FIELD

This invention relates to the determination of the density of underground formations using neutron-gamma ray measurements. In particular, the invention provides techniques for analysing neutron-gamma ray measurements relating to underground formations surrounding boreholes of the type used in the oil and gas industry.

BACKGROUND ART

A number of techniques are known for characterising the properties of formations surrounding boreholes. Typically, a tool body comprising a signal source is placed in the borehole and the source used to interrogate the formation. A signal returning to the tool body is measured and the parameter of interest calculated. Where the tool body is positioned tight against the borehole wall, the signal essentially only passes through the formation surrounding the borehole and so can be used in a straightforward manner to derive the property of interest. However, where there is a space between the tool body and the borehole wall (sometime called 'standoff'), problems can arise because the signal passes through the contents of the borehole before passing into the formation or returning from the formation to the tool body. Thus, the contents of the borehole, typically fluids, will have an effect on the signal and this effect must be removed, or compensated, to determine the formation property of interest.

One well-known way to compensate for borehole effects is to make two measurements of the returning signal at differing distances from the source. Over the scale of a typical measurement, the standoff and borehole effects do not vary substantially between the near and far measurement locations, such that the only significant difference between the two measurements is due to the difference in the signal path in the formation, and hence the formation property of interest.

The measurement of formation density is a well-known way of characterising underground formations surrounding oil and gas wells and the like. There are a number of techniques based on nuclear measurements that can be used to do this. The most common technique is known as gamma-gamma density logging in which the formation is irradiated from a gamma-ray source, e.g. $^{137}$Cs emitting gamma rays at 0.66 MeV, in the tool body. The gamma rays pass through the formation, undergoing interactions with the constituents of the formation and return to the borehole where the flux is detected. This can then be analysed to determine formation density. This technique has been used for both wireline and LWD applications for well logging. To compensate for borehole effects, the dual-detector approach described above is frequently used. U.S. Pat. No. 4,297,575 describes a gamma-gamma density logging method.

Because gamma-gamma density logging provides a bulk formation density, and underground formations are typically porous, it has been proposed to combine gamma-gamma density logging with a neutron measurement of porosity. In neutron porosity logging, the formation is irradiated with high-energy neutrons from either a chemical source, e.g. $^{241}$AmBe producing 4 MeV neutrons, or an accelerator source, e.g. a pulsed D-T accelerator producing 14 MeV neutrons. As they pass through the formation, they interact with hydrogen nuclei in the pore fluids, scattering and losing energy. The scattered neutrons are detected back in the tool body and can be analysed to determine the amount of hydrogen, and hence the porosity of the formation. Neutron porosity measurements can be combined with gamma-gamma density measurements to allow determination of the density of the rock matrix, as is described in WO2007/149869. Again, dual detector compensation techniques have been adopted to deal with borehole effects.

More recently, techniques for determining formation density based on irradiation with high energy neutrons have been developed. Neutrons will be scattered by the formation depending on its density. Thus, measuring the returning neutrons can be used to obtain some determination of the formation density (neutron-neutron density). However, this can be subject to a number of interfering effects from the porosity effect of the formation. Neutron irradiation can also lead to inelastic scattering of neutrons with accompanying generation of gamma rays. These gamma rays can be used in a density determination method (neutron-gamma density). In this case, the formation is effectively acting as a secondary source of gamma rays from which density can be determined. WO96/08733, U.S. Pat. No. 5,608,215, and US2009/026359 disclose neutron-neutron and neutron-gamma techniques for density determination.

There are two common techniques for analysing dual-spaced nuclear measurements. In one, a simple cross-plot or ratio of the signals measured at the two detector spacings is used and compared to calibrated data from known formations. This approach is commonly used in neutron-neutron porosity and density and neutron-gamma density. Another is known as spine and rib processing and is used on gamma-gamma density. This approach is based on determination of a cross-plot of the measurements at the two detector spacings and the determination of a deviation to this cross plot due to tool standoff, the intersection of the cross-plot (spine) and deviation (rib) being used to determine the formation density Examples of these approaches can be found in the documents cited above.

This invention is based on the recognition that the spine and rib approach can be applied in neutron-gamma density techniques even though the fundamental process underlying the measurement (creation of gamma rays in the formation due to neutron irradiation) is substantially different to that of gamma-gamma density techniques relying on direct irradiation with gamma rays of known energy.

DISCLOSURE OF THE INVENTION

This invention provides a method of determining the density of an underground formation surrounding a borehole from measurement of gamma rays arising from irradiation of the formation by a nuclear source in a tool body located in the borehole, and measurement of gamma ray flux in the tool body at two different detector spacings from the source, the method comprising:

determining a substantially straight-line relationship between gamma-ray flux measurements at each different detector spacing with respect to the density of the formation for a tool body with no standoff;

determining a relationship defining the deviation with respect to tool standoff of the density determined from the measured gamma-ray flux measurements at the two different detector spacings from the density calculated from the straight line relationships; and for a given pair of gamma-ray flux measurements at the different detector spacings, determining the intersection of the relationship defining the deviation with the straight line relationship so as to indicate the density of the formation surrounding the borehole;

wherein the source is a neutron source and the gamma rays measured in the tool body are neutron-induced gamma rays resulting from neutron irradiation of the formation.

Where the neutron flux from the formation is measured in the tool body at two different detector spacings from the source the method can comprise using the neutron flux measurements to correct the gamma-ray flux measurements for the effects of neutron transport in the formation.

The gamma-ray flux measured can comprise gamma rays resulting from inelastic interactions between neutrons and the formation constituents.

If a neutron generator is used to generate the primary neutrons, determination of the flux of neutrons requires that means, such as a neutron monitor, be used to determine the primary neutron flux from the neutron generator. If a chemical source is used the primary flux can be determined through a calibration.

The density can be calculated for a gamma-ray flux measurement at a spacing according to the relationship:

$$\rho = a - b * ln(\text{net-inel}/F(n))$$

where a and b are experimentally-derived constants, net-inel is the net inelastic gamma-ray flux measured at a gamma-ray detector located at the spacing in question and $F(n)$ is a function of the neutron flux, n, measured for a corresponding neutron detector.

For a given pair of flux measurements, the density can be calculated by correcting the density determined for a flux measurement furthest from the source using the flux measurement closest to the source, according to the relationship;

$$\rho_b = \Sigma_{LS} + \Delta\rho$$

where $\rho_b$ is the density of the formation, $\rho_{LS}$ is the density calculated from the flux measurement furthest from the source, and $\Delta\rho$ is the deviation in density due to standoff. $\Delta\rho$ can be calculated according to the relationship of the form:

$$\Delta\rho = A(\rho_{LS} - \rho_{SS}) + B(\rho_{LS} - \rho_{SS})^2 + C(\rho_{LS} - \rho_{SS})^3 + \ldots$$

where $\rho_{SS}$ is the density calculated from the flux measurement closest from the source, and A, B, C, ... are experimentally derived constants.

A second aspect of the invention provides an apparatus for determining the density of a formation surrounding a borehole, the apparatus comprising:
  a tool body for location in the borehole;
  a neutron source in the tool body for irradiating the formation; and
  first and second detectors located in the tool body at corresponding first and second spacings from the neutron source;
wherein the first and second detectors are arranged to detect gamma rays resulting from neutron irradiation of the formation; the apparatus further comprising a processing system for
  determining a substantially straight-line relationship between gamma-ray flux measurements at each different detector spacing with respect to the density of the formation for a tool body with no standoff;
  determining a relationship defining the deviation with respect to tool standoff of the density determined from the measured gamma-ray flux measurements at the two different detector spacings from the density calculated from the straight line relationships; and
  for a given pair of gamma-ray flux measurements at the different detector spacings, determining the intersection of the relationship defining the deviation with the straight line relationship so as to indicate the density of the formation surrounding the borehole.

The apparatus preferably operates according to a method of the first aspect of the invention.

Further aspects of the invention will be apparent from the following description.

MODE(S) FOR CARRYING OUT THE INVENTION

Figure 1:
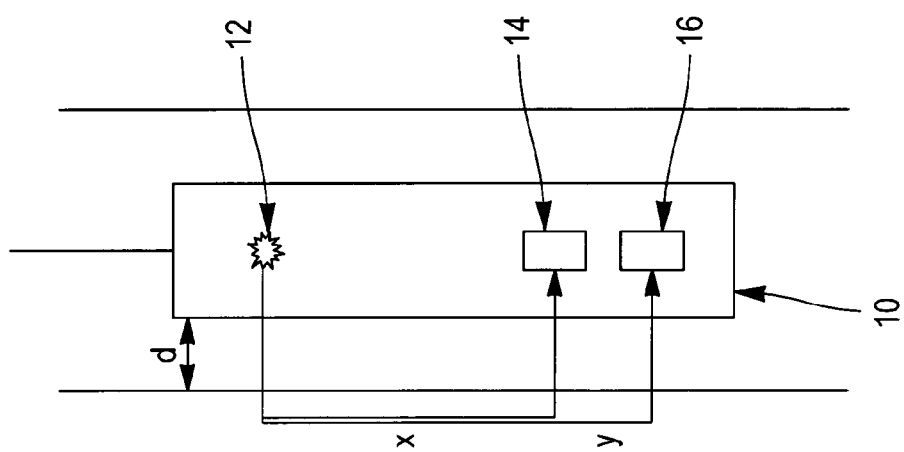
FIG. 1 shows a schematic representation of a dual-detector system for borehole compensation.

FIG. 1 shows a schematic representation of a borehole tool comprising a dual-detector system for borehole compensation for formation measurements. This tool architecture is used for tools to which the invention applies. In this system a tool body 10 (shown here as a wireline tool suspended in a borehole, but could also be an LWD tool) is positioned in a borehole with a standoff d between the body and the borehole wall. The tool includes a source, for example a nuclear source (a pulsed high-energy neutron source in the case of the present invention, e.g. a D-T 14 MeV source, but also possibly a gamma-ray source), and detectors 14 and 16 at respective short and long detector spacings from the source 12. In use, a signal passing from the source 12 to the short spaced detector 14 will cross the borehole standoff d twice and traverse a formation path of length X. The corresponding signal passing to the long-spaced detector 16 will also cross the borehole standoff d twice and will traverse a formation path length of X+Y. The difference between the two signals is due only to the extra formation path length Y and so subtraction of the short spaced signal from the long spaced signal should give a difference which is essentially attributable only to formation properties without any borehole effects resulting from standoff. While this is a simplified explanation of the dual-detector approach to compensation of borehole effects, it does give the basic techniques and approach used in the present invention.

Figure 2:
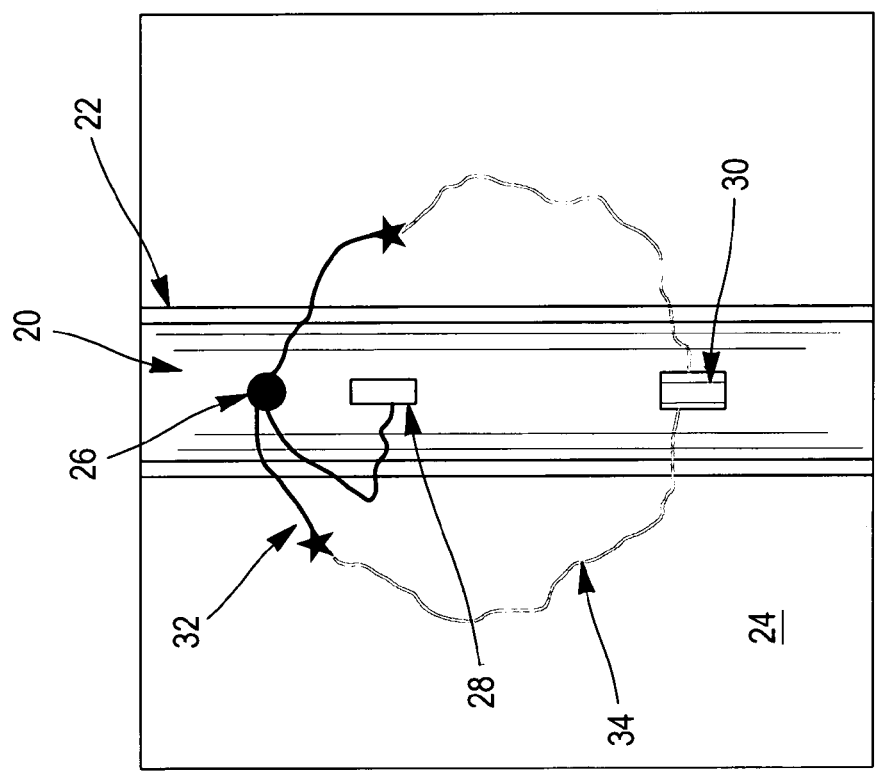
FIG. 2 shows a schematic view of a neutron-gamma density tool.

FIG. 2 shows a generic tool for neutron-gamma density measurements. The tool body 20 comprises an LWD tool forming part of a drill string (not shown). The tool body 20 is positioned in a borehole 22 with a standoff d between the tool body and the borehole wall/formation 24. As this is a drilling tool, the movement of the tool body 20 in the borehole can mean that the standoff can be anything between zero and a maximum of the difference between the tool diameter and the borehole diameter (when the tool is in contact with the borehole wall on one side). Thus any borehole effects on measurements due to standoff will vary. A 14 MeV accelerator neutron source 26 is mounted in the tool body 20. A neutron detector 28 is mounted in the tool body 22 spaced from the source 26 and configured to detect epithermal neutrons. A gamma-ray detector 30 is located in the body 20 at a different spacing.

In use, the source irradiates the formation 24 with bursts of high-energy neutrons 32. These interact with the constituents of the formation 24 in two main ways. In one, the neutrons undergo elastic scattering, losing energy to the formation and returning to the borehole at lower, epithermal energy where they are detected by the neutron detector 28. In the other, the neutrons undergo inelastic scattering, resulting in the formation of gamma rays 34. These gamma rays propagate through the formation, interacting with the electrons of the formation constituents and so are affected by the formation density. The gamma rays returning to the borehole are detected at the gamma-ray detector 30. The output of the detectors is processed in the tool, at the surface, or both in order to derive the properties of the formation from the measurements.

As is clear from the above description, the neutron-gamma density measurement is based on the detection of neutron-induced gamma rays at a detector that is placed far from the neutron source. The gamma-ray flux at the detector is influenced by neutron transport to the point of the gamma-ray-producing neutron interaction and the subsequent transport of the gamma-rays from their origin to the gamma-ray detector. In order to eliminate the influence of thermal neutron effects on the answer, only inelastic gamma-rays produced by high-energy neutrons are measured. The background from neutron capture is subtracted out. The output of a neutron detector is used to account for the transport effects of the neutrons producing the inelastic gamma rays. In practice, a dual-detector system will be used to compensate for borehole effects. This will comprise short-and long-spaced gamma-ray measurements SS, LS; and near and far neutron measurements Near and Far. Borehole effects due to standoff will arise because the densities of the fluids in the borehole are usually different than the formation density. Therefore, if the fluid density is lower than the formation density, the measured density with standoff will be correspondingly lower than the true formation density, and vice versa.

Figure 3:
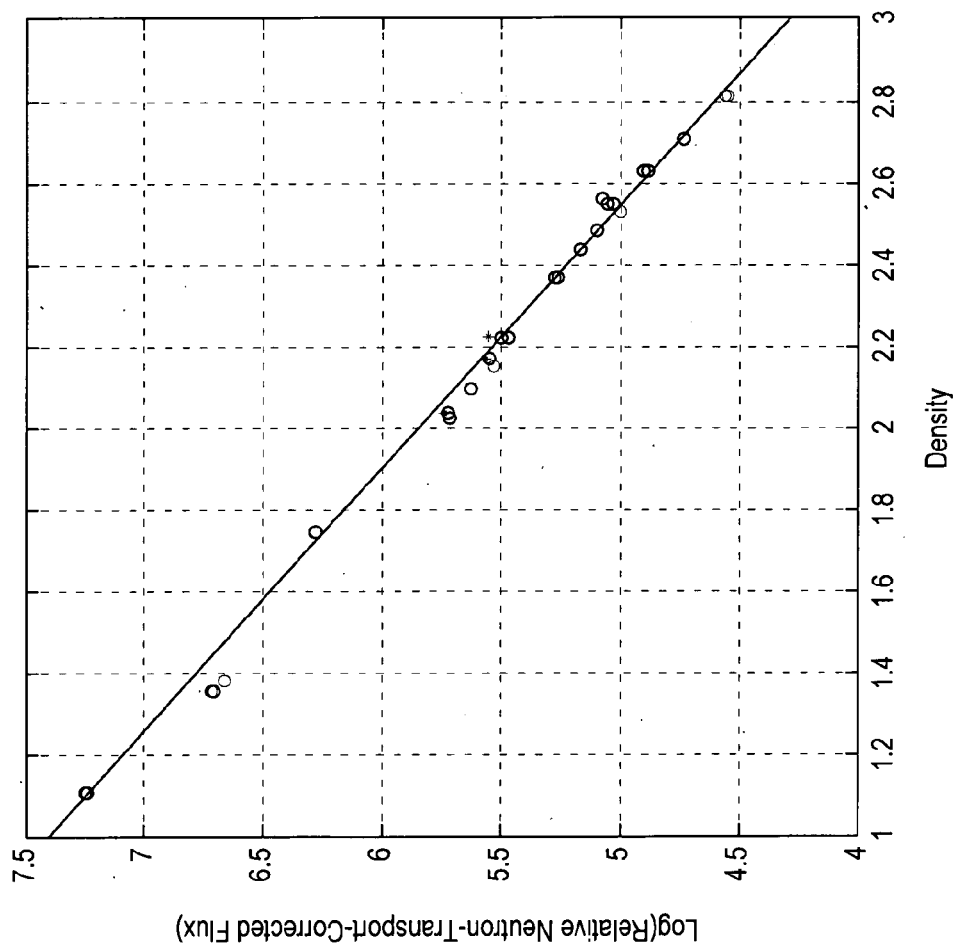
FIG. 3 shows a plot of long-spaced gamma-ray measurements vs density.

A neutron-gamma density response can be computed for both a short-spaced and long-spaced density by using $$\rho_{SS} = a_{SS} - b_{SS} \ln(\text{SSnet-inel}/F(\text{Near}))$$

$$\rho_{LS} = a_{LS} - b_{LS} \ln(\text{LSnet-inel}/F(\text{Far}))$$

where
SSnet-inel=Net inelastic count rate in the short-spaced detector
LSnet-inel=Net inelastic count rate in the long-spaced detector
Near=Count rate from a near-spaced neutron detector
Far=Count rate from a far-spaced neutron detector
and the functional form F is chosen to produce a linear dependence versus density as shown in FIG. 3 for the long-spaced density, $\rho_{LS}$. This plot shows the spine (no tool standoff) computed from the long-spaced detector. A similar plot can be made of the spine from the short-spaced detector, $\rho_{SS}$. In general, the functional form F will be different depending on the choice of neutron detector used to compensate for neutron transport effects.

An alternative embodiment to the afore-mentioned approach of using a near and a far neutron detector, is to use the count rate from a single detector for $\rho_{SS}$ and $\rho_{LS}$ using two different functions F for the respective detectors.

The neutron detectors are not limited to being detectors of epithermal neutrons. Detectors of fast, epithermal or thermal neutrons or a combination can be used.

Details of an appropriate form of spine and rib processing suitable for this invention can be found in Wahl, J. S., Tittman, J., Johnstone, C. W., and Alger, R. P., "*The Dual Spacing Formation Density Log*," Presented at the Thirty-ninth SPE Annual Meeting, 1964; and in Tittman, J., and Wahl, J. S., "*The Physical Foundations of Formation Density Logging (Gamma-Gamma)*, Geophysics, Vol. 30, 1965.

In the spine and ribs technique, the long-spaced density, $\rho_{LS}$, is used for the primary density measurement as the borehole effects arising from standoff make the least contribution to the overall measurement response, while the short-spaced density, $\rho_{SS}$, is used to correct the long-spaced density for tool standoff, as the borehole effects arising from standoff make a greater contribution to the overall measurement response.

The long-spaced density is corrected using the expression $$\rho_{true} = \rho_{LS} + \Delta\rho \qquad \text{Eqn. (1)}$$

where the correction term, $\Delta\rho$, is typically given by $$\Delta\rho = A(\rho_{LS} - \rho_{SS}) + B(\rho_{LS} - \rho_{SS})^2 C(\rho_{LS} - \rho_{SS})^3 + \ldots \qquad \text{Eqn. (2)}$$

such that $$\rho_b = \rho_{LS} + A(\rho_{LS} - \rho_{SS}) + B(\rho_{LS} - \rho_{SS})^2 + C(\rho_{LS} - \rho_{SS})^3 + \ldots \qquad \text{Eqn. (3)}$$

where $\rho_{LS}$ and $\rho_{SS}$ are the long- and short-spaced densities, respectively, $\rho_b$ is the corrected density, and A, B, C are constants derived from characterizing the response in known conditions.

Figure 4:
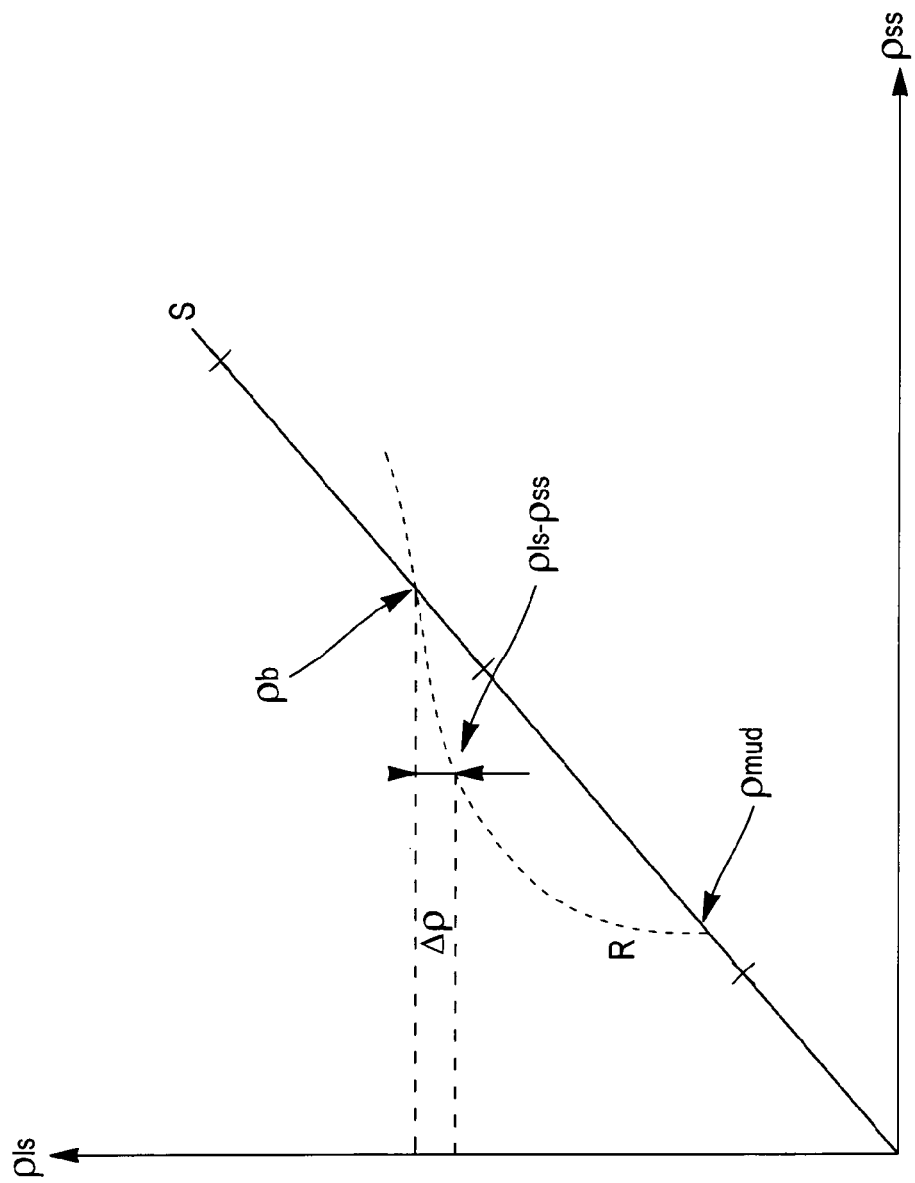
FIG. 4 shows a spine and rib plot determined according to the present invention.

FIG. 4 shows a spine and rib plot. The spine S comprises a cross-plot of densities measured at short $\rho_{SS}$ and long spacing $\rho_{LS}$. The rib R is the deviation $\Delta\rho$ from this straight line due to standoff. In the example shown, the fluid or mud density $\rho_{mud}$ is lower than the formation density $\rho_{LS}$ which means that both the long-spaced density $\rho_b$ and the short-spaced density $\rho_{SS}$ read lower than the true density $\rho_b$. However the short-spaced density $\rho_{SS}$ will be affected more by standoff and so the cross-plot measurement point will lie to the left of the true density point $\rho_b$ of the spine (and therefore above the line). The long-spaced density $\rho_{LS}$ reads lower than the true density $\rho_b$ by the amount $\Delta\rho$. By applying the correction given above the true density $\rho_b$ can be determined.

If $\rho_{mud}$ is higher than the formation density $\rho_b$, the short- and long-spaced densities $\rho_{SS}$, $\rho_{LS}$ read higher than the true density $\rho_b$ (i.e. to the right and below the spine) and the correction is applied in the opposite sense.

In FIG. 4, the rib intersects the spine at two points. At the lower point, it indicates an infinite standoff and so shows $\rho_{mud}$. The upper intersection is at $\rho_b$.

The constant A in equations (2) and (3) is related to the angle between the spine and rib shown in FIG. 4. The additional terms are included in the correction to account for curvature of the rib. Thus, the long-spaced density is corrected for standoff using the difference between the long- and short-spaced densities to measure tool standoff.

Figure 5:
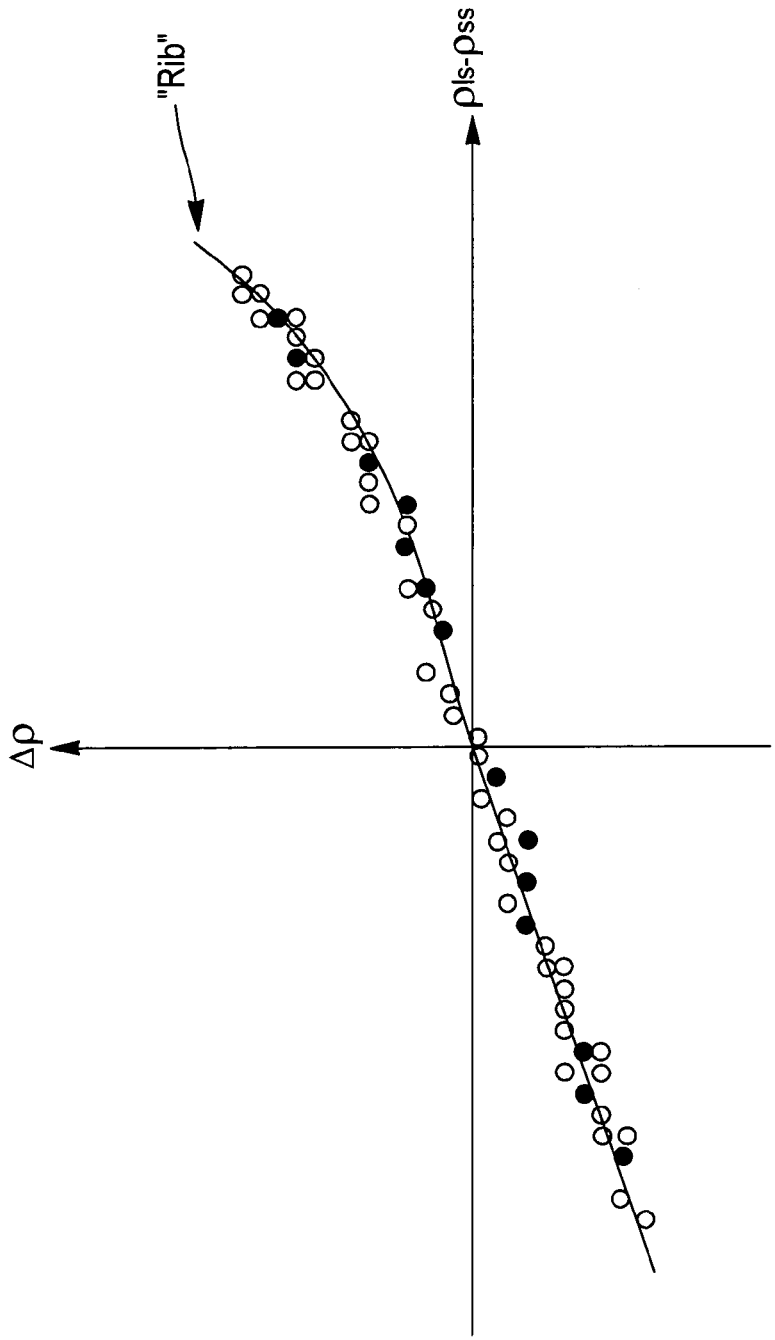
FIG. 5 shows a plot of a rib correction.

FIG. 5 illustrates the correction term $\Delta\rho$ as a function of the difference of short- and long-spaced densities $\rho_{LS} - \rho_{SS}$. Standoff in muds having densities greater than the formation yield positive values of $\Delta\rho$ (right hand side), while muds having densities less than the formation give negative values of $\Delta\rho$ (left hand side).

The approach described above can be changed while staying within the scope of the invention.

There are several advantages to using the spine and ribs technique of the present invention to correct for tool standoff compared with other techniques. Methods exist that attempt to correct for tool standoff by taking the ratio of the long- and short-spaced detector fluxes. These techniques generally result in only a partial correction for tool standoff. That is, the ratio of the fluxes still exhibits significant residual tool standoff effects, requiring further correction by other means, often requiring additional and perhaps unavailable information regarding the logging environment.

Techniques that use simple cross-plotting of the short- and long-spaced responses are intuitively appealing but suffer from: a) the practicalities of requiring very large data bases of tool responses in known conditions; b) needing accurate and often very complicated interpolation schemes when a condition encountered during logging does not lie near a data base point; and c) failing to yield a reasonable answer when a response is encountered during logging that falls outside the response data base "map" determined under known conditions.

The invention claimed is:

1. A method of determining the density of an underground formation surrounding a borehole from measurement of gamma rays arising from irradiation of the formation by a nuclear source in a tool body located in the borehole, and measurement of gamma-ray flux in the tool body at two different detector spacings from the source, the method comprising:
   determining a substantially straight-line relationship between gamma-ray flux measurements at each different detector spacing with respect to the density of the formation for a tool body with no standoff;
   determining a relationship defining the deviation with respect to tool standoff of the density determined from the measured gamma-ray flux measurements at the two different detector spacings from the density calculated from the straight line relationships; and
   for a given pair of gamma-ray flux measurements at the different detector spacings, determining the intersection of the relationship defining the deviation with the straight line relationship so as to indicate the density of the formation surrounding the borehole;
wherein the source is a neutron source and the gamma rays measured in the tool body are neutron-induced gamma rays resulting from neutron irradiation of the formation.

2. A method as claimed in claim 1, further comprising measuring gamma-ray flux in the tool body at two different detector spacings from the source.

3. A method as claimed in claim 1, wherein neutron flux from the formation is measured in the tool body at two different detector spacings from the source, the method further comprising using the neutron flux measurements to correct the gamma ray flux measurements for the effects of neutron transport to the point of origin of the neutron-induced gamma rays.

4. A method as claimed in claim 1, wherein the measured gamma-ray flux comprises gamma rays resulting from inelastic interactions between neutrons and the formation constituents.

5. A method as claimed in claim 1, wherein the measurement of gamma-ray flux comprises measuring gamma rays resulting from capture reactions between neutrons and the formation constituents.

6. A method as claimed in claim 5, further comprising measuring gamma rays resulting from thermal neutron capture reactions.

7. A method as claimed in claim 1, further comprising measuring neutron flux from the formation in the tool body at two different detector spacings from the source.

8. A method as claimed in claim 7, wherein the density is calculated for a gamma-ray flux measurement at a spacing according to the relationship:

$$\rho = a - b * ln(\text{net-inel}/F(n))$$

where a and b are experimentally-derived constants, net-inel is the net inelastic gamma-ray flux measured at a gamma ray detector located at the spacing in question and $F(n)$ is the neutron flux measured for a corresponding neutron detector.

9. A method as claimed in claim 1, wherein for a given pair of flux measurements, the density is calculated by correcting the density determined for a flux measurement furthest from the source using the flux measurement closest to the source, according to the relationship:

$$\rho_b = \rho_{LS} + \Delta\rho$$

where $\rho_b$ is the density of the formation, $\rho_{LS}$ is the density calculated from the flux measurement furthest from the source, and $\Delta\rho$ is the deviation in density due to standoff.

10. A method as claimed in claim 9, wherein $\Delta\rho$ is calculated according to a relationship of the form:

$$\Delta\rho = A(\rho_{LS} - \rho_{SS}) + B(\rho_{LS} - \rho_{SS})^2 + C(\rho_{LS} - \rho_{SS})^3 + \ldots$$

where $\rho_{SS}$ is the density calculated from the flux measurement closest from the source, and A, B, C, ... are experimentally derived constants.

11. Apparatus for determining the density of a formation surrounding a borehole, the apparatus comprising:
   a tool body for location in the borehole;
   a neutron source in the tool body for irradiating the formation; and
   first and second detectors located in the tool body at corresponding first and
   second spacings from the neutron source;
wherein the first and second detectors are arranged to detect gamma rays resulting from neutron irradiation of the formation; the apparatus further comprising a processing system for
   determining a substantially straight-line relationship between gamma-ray flux measurements at each different detector spacing with respect to the density of the formation for a tool body with no standoff;
   determining a relationship defining the deviation with respect to tool standoff of the density determined from the measured gamma-ray flux measurements at the two different detector spacings from the density calculated from the straight line relationships; and
   for a given pair of gamma-ray flux measurements at the different detector spacings, determining the intersection of the relationship defining the deviation with the straight line relationship so as to indicate the density of the formation surrounding the borehole.

12. Apparatus as claimed in claim 11, wherein the processing system is configured to further measure gamma-ray flux in the tool body at two different detector spacings from the source.

13. Apparatus as claimed in claim 11, wherein neutron flux from the formation is measured in the tool body at two different detector spacings from the source, wherein the processing system is configured to further use the neutron flux measurements to correct the gamma ray flux measurements for the effects of neutron transport to the point of origin of the neutron-induced gamma rays.

14. Apparatus as claimed in claim 11, wherein the measured gamma-ray flux comprises gamma rays resulting from inelastic interactions between neutrons and the formation constituents.

15. Apparatus as claimed in claim 11, wherein the measurement of gamma-ray flux comprises measuring gamma rays resulting from capture reactions between neutrons and the formation constituents.

16. Apparatus as claimed in claim 15, wherein the processing system is configured to further measure gamma rays resulting from thermal neutron capture reactions.

17. Apparatus as claimed in claim 11, wherein the processing system is configured to further measure neutron flux from the formation in the tool body at two different detector spacings from the source.

18. Apparatus as claimed in claim 17, wherein the density is calculated for a gamma-ray flux measurement at a spacing according to the relationship:

$$\rho = a - b * ln(\text{net-inel}/F(n))$$

where a and b are experimentally-derived constants, net-inel is the net inelastic gamma-ray flux measured at a gamma ray detector located at the spacing in question and $F(n)$ is the neutron flux measured for a corresponding neutron detector.

19. Apparatus as claimed in claim 11, wherein for a given pair of flux measurements, the density is calculated by correcting the density determined for a flux measurement furthest from the source using the flux measurement closest to the source, according to the relationship:

$$\rho_b = \rho_{LS} + \Delta\rho$$

where $\rho_b$ is the density of the formation, $\rho_{LS}$ is the density calculated from the flux measurement furthest from the source, and $\Delta\rho$ is the deviation in density due to standoff.

20. Apparatus as claimed in claim 19, wherein $\Delta\rho$ is calculated according to a relationship of the form:

$$\Delta\rho = A(\rho_{LS} - \rho_{SS}) + B(\rho_{LS} - \rho_{SS})^2 + C(\rho_{LS} - \rho_{SS})^3 + \ldots$$

where $\rho_{SS}$ is the density calculated from the flux measurement closest from the source, and A, B, C, . . . are experimentally derived constants.

* * * * *